April 10, 1934.   A. S. FITZ GERALD   1,954,669
ELECTRIC CONTROL SYSTEM
Filed Aug. 14, 1930
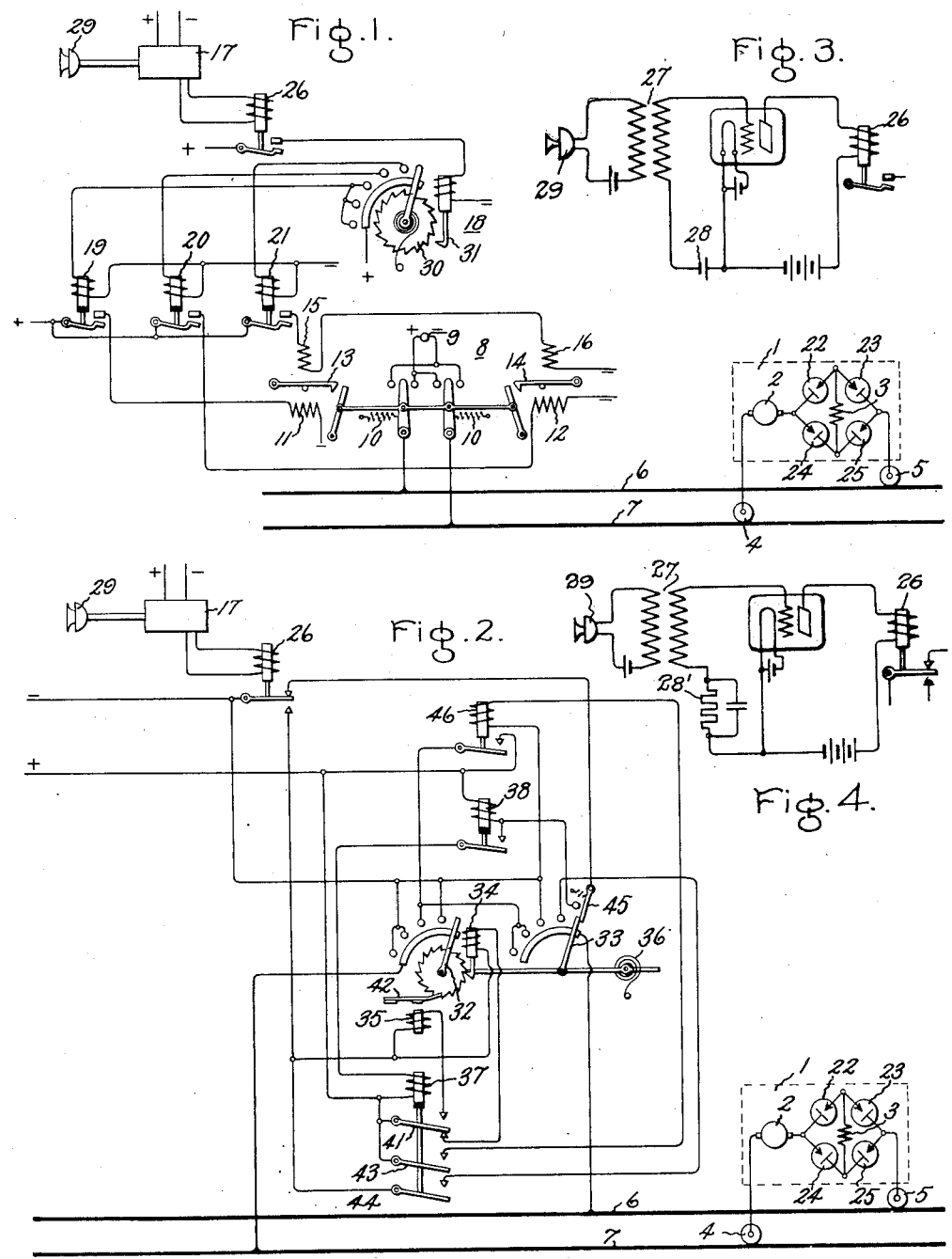
Inventor:
Alan S. Fitz Gerald,
by Charles E. Tullar
His Attorney.

Patented Apr. 10, 1934

1,954,669

UNITED STATES PATENT OFFICE 1,954,669

ELECTRIC CONTROL SYSTEM

Alan S. Fitz Gerald, Wynnewood, Pa., assignor to General Electric Company, a corporation of New York Application August 14, 1930, Serial No. 475,268

6 Claims. (Cl. 177—353)

My present application is a continuation in part of my copending application, Serial No. 288,012, filed June 25, 1928 issued May 12, 1931, as Patent No. 1,805,167 and entitled Electric control system.

My present invention relates to electric control systems and more particularly to systems for controlling the operation of electrical circuits and mechanism in response to current impulses such as may be produced in response to the syllables, or distinct sounds of speech.

More particularly my invention relates, although it is not limited thereto, to systems for controlling dynamo-electric machines such as may be used in connection with toy trains and the like in response to speech, and it has for one of its purposes to provide means whereby circuits, such, for example, as those utilized to control dynamo-electric machines for operating vehicles may be controlled as desired, in response to the verbal commands of the operator.

Still a further purpose of my invention is to provide efficient means of a simple and relatively inexpensive nature for selectively effecting different operations of electrical mechanism, as for example by reversing the polarity, and otherwise altering the electrical condition of a circuit or circuits in selective response to current impulses such as those which may be produced by speech.

The novel features which I believe to be characteristic of my invention will be set forth with particularity in the appended claims. My invention itself, however, both as to its organization and method of operation, together with further objects and advantages thereof, may best be understood by reference to the following description taken in connection with the accompanying drawing, in which Figs. 1 and 2 represent different embodiments of my invention, Figs. 3 and 4 represent parts thereof.

While I shall describe my invention in connection with a dynamo-electric machine for operation of a moving device, such as a toy train, for example, it will of course be understood that it may be used in other applications of utility as well.

Referring to Fig. 1, I have represented at 1 an electric locomotive such for example as those commonly used for operating toy trains and the like and which is adapted to be driven by a dynamo-electric machine comprising an armature 2 and a field winding 3. The armature 2 and field winding 3 are electrically connected to the wheels 4 and 5 of the locomotive. The track 6, 7 upon which the locomotive 1 is adapted to operate may be supplied with potential of either polarity through the contact members of a switch 8 from any suitable source of direct current potential 9.

The switch 8 comprises a position relay which is suitably biased as by means of springs 10 to an intermediate position in which the track conductors 6 and 7 are disconnected from the source of potential. The switch is provided with a pair of actuating electro-magnets 11 and 12. If the magnet 12 is energized the switch is actuated to the right and potential of a certain polarity is applied to the track conductors. If the coil 11 is energized the switch is actuated to the left and potential of the opposite polarity is applied to the track conductors. The switch is adapted to be retained in either of these positions by means of latching members 13 and 14, these members being controlled by electromagnets 15 and 16. Assuming that the switch is retained in either of the latter two positions mentioned, and the corresponding coil 15, 16 becomes energized the latching member which is actuated thereby will release the switch and permit it to return to its normal position which is that shown in the drawing.

In order to energize the different electromagnets of the switch 8 in response to the verbal commands of the operator means 17 are provided for producing direct current impulses in response to each of the syllables of the operator's speech together with a selector switch 18, which is actuated in response to the impulses produced by the device 17 to control the energization of additional relays 19, 20 and 21. These latter relays in turn control the energization of the electromagnets 11, 12, 15 and 16 of the switch 8. If the selector switch 18 is actuated to its first position, as in response to a single impulse from the device 17, the relay 21 will be actuated thereby to cause energization of electromagnets 15 and 16 of the switch 8. If the switch 18 is actuated to its second position the relay 20 is actuated to energize the electromagnet 12, thereby to actuate the switch 8 to the right and supply current of a certain polarity to the track conductors. If the relay 18 is actuated to the third, or any subsequent position, the relay 19 will be actuated to energize the electromagnet 11, thereby to actuate the switch 8 to the left to supply current of a different polarity to the track.

To cause the dynamo-electric machine 2 to reverse its direction of rotation and hence to cause the locomotive 1 to reverse its direction of travel on the track, means are provided upon the locomotive whereby current flowing in either the armature winding or the field winding, but preferably the latter, is maintained of a constant polarity independently of reversal of polarity in the potential which is supplied to the track conductors, or to the other winding of the dynamo-electric machine. This means comprises a plurality of asymmetrically conducting devices so connected that the field winding 3 of the dynamo-electric machine is included in the circuit in bridge relation to the applied electromotive force. Each terminal of the field winding 3 is connected to both sides of the track circuit 6, 7 through oppositely connected asymmetrically conducting devices 22, 23 and 24, 25, the asymmetrically conducting devices which connect opposite terminals of the field winding to the same side of the track circuit being also oppositely connected.

As thus arranged, it will be seen that if the track conductor 6 is at positive potential with respect to the potential of track conductor 7 current will flow through the field winding from the track conductor 6 through the wheel 5 of the locomotive, asymmetrically conducting device 23, field winding 3, asymmetrically conducting device 24 and armature 2 to the track conductor 7. If the conductor 7 is at positive potential with respect to the potential of conductor 6 current will flow from the conductor 7 through the armature 2, asymmetrically conducting device 22, field winding 3, asymmetrically conducting device 25 to conductor 6. It will be seen that under both of these conditions the current in the field winding 3 flows in the same direction, whereas that of the armature 2 is reversed. Accordingly the direction of rotation of the armature will reverse in response to reversal of polarity of the potential of track conductors 6, 7. By this means as thus described it will be seen that the direction of rotation of the motor is reversed in response to reversal of polarity of the potential which is applied to the track, this result being effected by means which are entirely electrical. Thus the necessity for mechanical switching means upon the train and for operations involving moving parts, such as mechanical polarized relays and the like, is obviated.

Although I have shown the field winding 3 connected in series relation with the armature 2 it will of course be understood that it may be connected with reference to the armature in any manner well-known in the art, as for example, in shunt relation with it. The asymmetrically conducting devices 22, 23, 24, 25 may comprise any suitable type of electron discharge device, such as the ordinary evacuated vessel containing dissimilar electrodes spaced apart and surrounded by a gaseous medium such as neon or argon at an attenuated pressure. Preferably, however, these devices are of the form comprising a copper plate having cupreous oxide formed thereon and mounted between suitable electrodes as shown and described in United States Patent No. 1,640,335 to Lars O. Grondahl issued August 23, 1927.

The impulse producing device 17 comprises an electron discharge device of the usual three element type as shown in Fig. 3, having a relay 26, connected in the anode circuit thereof and the secondary winding of a transformer 27 connected between the grid and cathode thereof, this grid being biased to a suitable negative potential by means of a battery 28. In the primary winding of the transformer is connected a suitable microphone 29. When the operator speaks into the microphone 29 alternating current potentials are impressed upon the grid of the discharge device causing an increase in the direct current which flows in the anode circuit and thereby energizing the relay 26. The contacts of this relay are connected in series with the actuating coil of the selector switch 18, such that a current impulse is produced through the actuating winding of the switch 18 in response to each syllable, or distinct sound, of the operator's speech.

As thus described the operation of the system is as follows. Let us assume that the operator speaks into the microphone 29 commanding the locomotive 1 to "go straight ahead". This command comprises essentially three syllables, or three distinct sounds, and accordingly three current impulses will be produced in the actuating winding of the switch 18. The wiper of the switch 18 will then be actuated to its third contact by means of the ratchet and pawl arrangement 30, 31. In this position the relay 19 will be energized through a circuit extending from positive battery through the armature of the switch 18 and its third contact and relay 19 to the negative battery. The relay 19 will then close its contact, energizing the electromagnet 11 through an obvious circuit. Switch 8 will be actuated to the left and will be retained therein by the latching member 13. In this way potential of a certain polarity is applied to the track conductors and the dynamo-electric machine will drive the locomotive 1 in a forward direction. After the third impulse the operator remains silent and the pawl 31 returns to its normal position under its bias. Due to inertia of the ratchet 30 the wiper does not return to its normal position between syllables. For the same reason the wiper remains upon the contact to which it is last actuated for a longer period than upon contacts which it passes in being actuated from its normal position to a predetermined contact or in returning to its normal position under its bias. The relays 19, 20, and 21 are sufficiently slow acting to prevent closing of their contacts as the wiper of the selector switch 18 is actuated rapidly over the contacts or as it returns in its course to the normal position. These relays do, however, respond to the longer engagement of the wiper of the switch 18 with the last contact to which it is actuated.

Let us assume that the next command of the operator is "stop". This command comprises a single sound, or syllable. Relay 21 will then be actuated to close its contact, thereby to energize relays 15 and 16, operating the latching members and restoring the switch 8 to its normal position. The locomotive will then stop. If the next command of the operator is one comprising two syllables, as for example, "back up" relay 20 will be actuated, thereby causing energization of the electromagnet 12 and the switch 8 will be actuated to the right. In this position the polarity of the potential applied to the track conductors is opposite to that formerly applied and the dynamo-electric machine is caused to drive the locomotive 1 in the reverse direction.

It will be noted that each of the contacts of the selector switch 18 beyond and including the third contact are connected together. The purpose of this is to permit the locomotive to run in a certain direction in response to any command of the operator comprising three or more syllables. For example, if the operator speaks into the microphone commanding the locomotive to "go along the track and stop in front of the gentleman", the locomotive will perform the same operation which it did in response to "go straight ahead". When it has reached the desired point upon the track the operator may blow slightly into the microphone and the locomotive will stop.

In accordance with the embodiment of my invention shown in Fig. 2 the selector switch 8 is replaced by one of a different type comprising a pair of wipers 32 and 33, actuating winding 34 and a releasing winding 35. This switch is biased to the position shown in the drawing by means of a spring 36, and the wipers thereof are adapted to be actuated from this position through each of a plurality of additional positions, in response to successive actuation of the actuating winding or motor magnet 34. Upon energization of the releasing winding 35 the switch immediately returns to the initial position. The relay 26 in this case is assumed to be normally energized and arranged to be deenergized when speech waves from the microphone 29 are impressed upon the device 17; that is, the detector 17 in this case would preferably be of the grid-leak rather than of the grid-bias type, the battery 28 of Fig. 3 being replaced by a parallel combination of resistance and capacity. This modified impulse producing circuit is shown in Fig. 4 wherein the electron discharge device is of the grid-leak type, having a combination of resistance and capacity 28' in the input circuit. When the operator speaks into the microphone 29, alternating circuit-potentials are impressed upon the grid circuit of the discharge device causing a decrease in anode current, thereby deenergizing the relay 26.

The operation of the system is as follows:—
Let us assume that the operator speaks three syllables, or three distinct sounds, into the microphone as, for example, the command to "go straight ahead", relay 26 is deenergized in response to each syllable and by means of its lower contact completes a circuit which extends from the negative side of the source of potential through the lower contacts of relay 26, motor magnet 34 and the lower contact and armature 41 of relay 37 to the positive side of the source of potential. Motor magnet 34 thus operates the wipers 32 and 33 through three successive steps, and hence on to their third contacts where they are retained by the pawl 42. When wiper 33 leaves its normal position and off-normal switch 45 operates to its circuit closing position, the contacts of switch 45 are connected in series with a time-delay relay 38 and the upper contact of the relay 26, so that between each of the syllables of speech and at the end of the command, the winding of relay 38 becomes energized. This relay is of the slow-closing type such that its contacts do not close until the end of the command. Upon closing its contacts it energizes relay 37 which is also of the slow-closing type. Relay 37 picks up after the time delay, thereby closing a circuit leading from the positive side of the source of potential through its armature 43, relay 46, to the negative side of the source of potential. Relay 46 then operates and completes the track circuit which extends from the positive source of potential through the contacts of relay 46, third contact of the right-hand bank of the selector switch and its cooperating wiper 33 to the upper rail of the track, thence from the lower rail of the track through the wiper and third contact of the left-hand bank of the selector switch to the negative side of the source of potential. Thus the vehicle will be caused to be operated in a certain direction. This condition will be retained until a further command of the operator.

Let us assume that the next command of the operator is "stop". Since relay 37 is now energized a circuit will be completed upon deenergization of relay 26 extending through the lower contact of relay 26, release magnet 35 and the upper contact and armature 41 of relay 37 back to the positive side of the source of potential. Relay 35 will then attract the pawl 42 and cause the wipers 32 and 33 to return to their initial position, in which the track circuit is deenergized.

Let us assume that the operator now speaks the command "back up" into the microphone. The wipers 32 and 33 will then come to rest on their second contact and, upon operation of relay 46, the track circuit will be completed from the positive side of the source of potential through contacts of relay 46, second contact of the left-hand bank of the selector switch and wiper 32 to the lower rail of the track, and thence from the upper rail of the track through wiper 33 and second contact of the cooperating contact to the negative side of the source of potential. It will be seen that the polarity of current supplied to the track is thus of a polarity opposite to that formerly applied. The operation of the system to stop the vehicle in response to the command of one syllable is exactly as before.

If the selector switch is in its normal position and a command of one syllable is spoken into the microphone, the wipers 32 and 33 will be operated into engagement with their first contacts, after which relays 38 and 37 will be operated as before. Relay 37, upon operation completes a circuit for the releasing magnet 35 which extends from the positive side of the source of potential through armature 41 of relay 37, releasing magnet 35, armature 44, first contact of the right-hand bank and wiper 33 through the upper track rail, wheels and equipment on the vehicle to the lower track rail, and thence through wiper 32 and the first contact of the cooperating bank to the negative side of the source of potential. Magnet 35 then attracts the releasing pawl 42 and causes the switch to be returned to its initial position.

While I have shown and described my invention with particular reference to the operation of toy locomotives and the like it will, of course, be understood that it is not limited thereto since it is also applicable in the field of power purposes as well as, for example, for the control of motors for operation of electric cable cars, hoists, elevators and the like. Further it will be understood that my switching means may be utilized for affecting the character of the potential applied to the electric circuit comprising the track conductors in any desired way to effect control of the locomotive.

While I have described particular embodiments of my invention it will be understood that I do not wish to be limited thereto since many modifications, both in the circut arrangement and in the instrumentalities employed may be made without departing from the spirit and scope of my invention as set forth in the appended claims.

What I claim as new and desire to secure by Letters Patent of the United States is:

1. In a control system, the combination of an electric circuit, a source of direct current potential, means for producing current impulses in response to syllables of speech, and means responsive to a predetermined number of said current impulses to connect said direct current source to supply potential of a certain character to said circuit, said means being responsive to a different number of said impulses to connect said direct current source to supply potential of a different character to said circuit and responsive to a third number of said impulses to disconnect said direct current source from said circuit.

2. In a control system, the combination of an electric circuit, means for producing current impulses in response to syllables of speech, a source of direct current potential, and switching means responsive to a predetermined number of said current impulses to connect said direct current source to supply potential of a certain polarity to the circuit, said means being responsive to any number of impulses greater than said predetermined number to connect said direct current source to supply potential of the opposite polarity to the circuit and to a number of impulses less than said predetermined number to disconnect said direct current source from said circuit.

3. In a control system, an electric circuit, a source of unidirectional potential, means for producing current impulses in response to the syllables of speech, switching means responsive to a predetermined number of said current impulses for connecting said source to supply current of a certain polarity to said circuit and responsive to a different number of impulses to connect said source to supply current of different polarity to said circuit, means for retaining said switching means in either position and means responsive to a third predetermined number of impulses for operating said retaining means.

4. In a control system, an electric circuit, a source of unidirectional potential, means for producing current impulses in response to the syllables of speech, a relay biased normally to disconnect said source from said circuit and arranged for operation to either of two positions to connect said source to supply current of different polarity to said circuit, latching means for retaining said relay in either position and means including a selecting device responsive to the number of said current impulses for actuating said relay to either of said positions and for actuating said latching means to permit said relay to assume the normal position.

5. In a control system, an electric circuit, a source of unidirectional potential normally disconnected from said circuit, means for producing current impulses in response to the syllables of speech, selective switching means responsive to the number of said current impulses to connect said source to supply potential of either polarity to the circuit and time responsive means for preventing connection of said source to the circuit during intervals between said impulses.

6. The combination, of mechanism controlled by the spoken syllables of commands of the operator, selective switching means having a plurality of positions, each position corresponding to a certain function of said mechanism, means including connections to each of said positions for controlling said mechanism and means responsive to the number of distinct sounds of the spoken command of the operator for operating said selective switching means to a position corresponding to the function to be performed.

ALAN S. FITZ GERALD.